Patented June 30, 1953

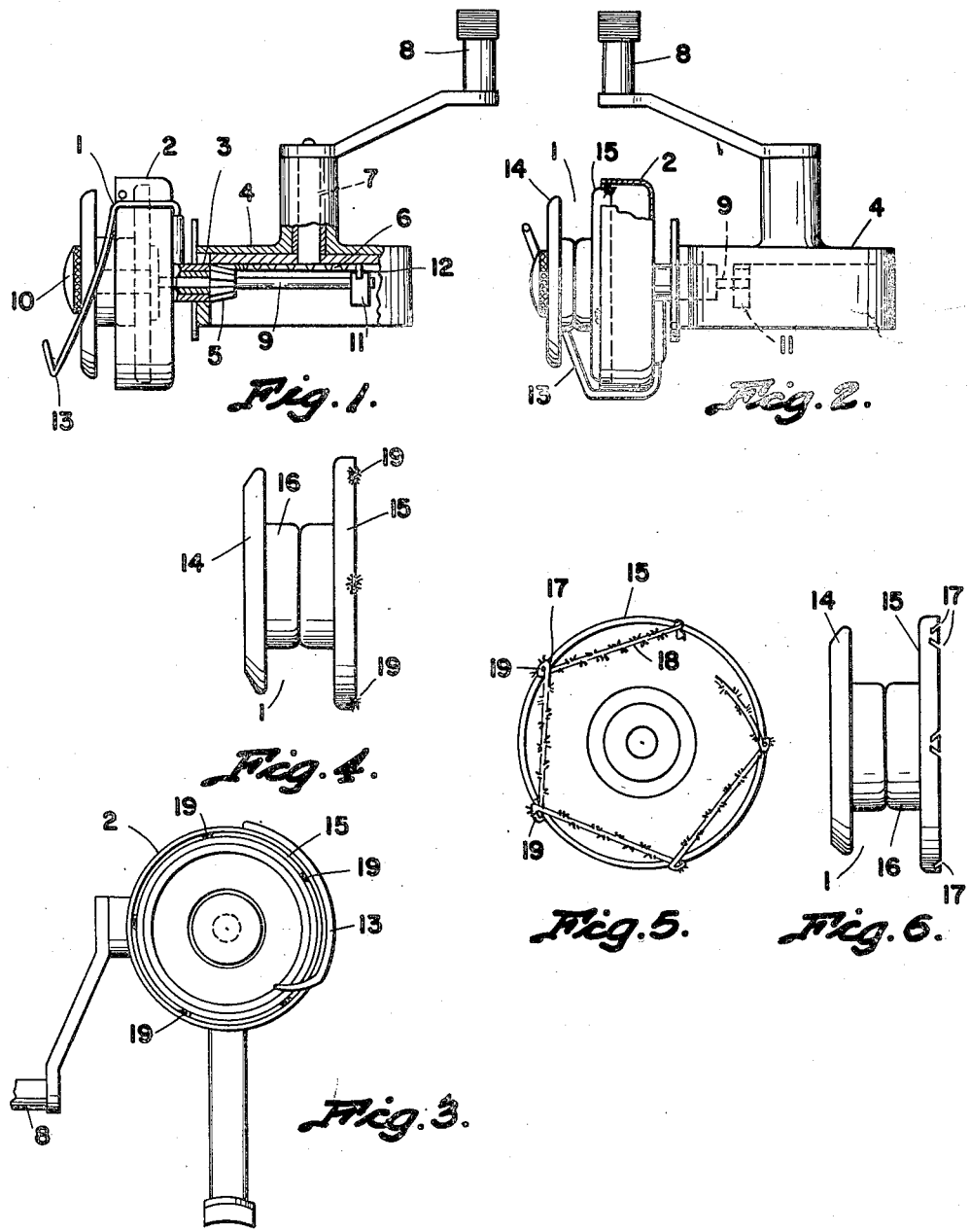

2,643,828

UNITED STATES PATENT OFFICE 2,643,828

NONFOULING SPOOL FOR FISHING REELS

Edwin E. Vincent, Springfield, Mass.

Application March 2, 1951, Serial No. 213,592

2 Claims. (Cl. 242—84.4)

The present invention relates to fishing reels, particularly casting reels which permit a fishing line to run free from a normally stationary spool, and provide for quick rewinding of the line on the spool.

The object of the present invention is to provide a fishing reel of the above indicated type with a spool constructed so as to prevent the line from fouling whenever it becomes slack, before or after casting, or as the line is wound upon the spool by the rotation of the flyer element of the reel with respect to the spool. Briefly stated, the present invention resides in providing one flange of the spool with spaced tufts of fibrous material which project into the space between the spool flange and the surrounding portion of the flyer to prevent the line from slipping into this space and to create a brushing effect when the flyer rotates.

The above and other advantageous features of the invention will hereinafter more fully appear from the following description, considered in connection with the accompanying drawings, in which, Fig. 1 is a top plan view of a casting reel provided with a non-fouling spool embodying the present invention, with some parts shown in section.

Fig. 2 is a top plan view of the reel shown in Fig. 1, with the spool occupying a different position with respect to the flyer.

Fig. 3 is a view in end elevation of the reel shown in Fig. 1, as viewed from the left.

Fig. 4 is a view in side elevation of the non-fouling spool removed from the reel.

Fig. 5 is a view in end elevation of the spool shown in Fig. 4, as viewed from the right.

Fig. 6 is a view in side elevation of the spool shown in Fig. 4 with the fibrous material removed therefrom.

Referring first to Figs. 1 and 2 of the drawings, a spool 1 embodying the present invention is shown, for purposes of illustration, as being mounted on a casting reel which provides a rotatable flyer 2 of generally cupped-shaped form. The flyer 2 is mounted on a sleeve 3 which is rotatable within a housing 4, with the sleeve 3 being driven by a pinion 5 in mesh with a gear 6 mounted on a shaft 7. The shaft 7 extends at right angles to the sleeve 3, and is adapted to be turned by means of a handle 8, so as to impart rotative movement to the flyer 2.

The spool 1 is mounted on a rod 9 which extends through the sleeve 3 and is slidable therein. The spool 1 is held on the outer end of the rod 9 by a nut 10, and the rod 9, with the spool 1 thereon, is adapted to be moved back and forth within the housing 4 by means of a block 11 mounted on the inner end of the rod 9 and connected by an eccentric pin 12 to the gear 6. Therefore, rotation of the gear 6 by turning the handle 8 will impart a back and forth movement to the rod 9 which will cause the spool 1 to be traversed with respect to the rotating flyer 2. The extent of this traversing movement between the spool 1 and the flyer 2 will be apparent from a consideration of Figs. 1 and 2, and the purpose of the present invention is to prevent the line L carried by the spool 1 from becoming fouled in the space between the spool and flyer. Such fouling of the line L is liable to occur when it is allowed to become slack, before or after casting, or when the line is being rewound on the spool after a cast by the operation of a laying finger 13 movable with the flyer 2, which finger serves to carry the line around the axis of the spool 1.

Referring now to Figs. 4 and 5 of the drawings, there the spool 1 is shown as having been removed from the reel in order to better illustrate the means for preventing fouling of the line. It is to be noted that the spool 1 consists of spaced flanges 14 and 15 connected by a hub portion 16, with the flange 14 being of somewhat smaller diameter than the flange 15. When the spool 1 is mounted on the rod 9, the flange 14 faces outwardly and always extends beyond the flyer 2 to permit the line L to be freely withdrawn endwise from the spool when using the reel for casting. The other flange 15 is of such diameter as to move freely within the flyer 2 when the line is rewound on the spool with a traversing movement, by turning the handle 8, and this flange 15 is provided with means for preventing fouling of the line by passing between the flange 15 and the flyer 2, as the winding takes place, or whenever the line becomes slack.

As best shown in Fig. 6, the edge of the flange 15 is provided with a number of pairs of slots 17 which are inclined with respect to each other, and a length of fibrous material 18 is laced back and forth into the slots 17 from within the flange 15, so as to provide a series of short loops 19 projecting outside the flange 15, as shown in Fig. 5. The material 18 is of a soft fibrous nature, such as chenille, so that each loop 19 on the outside of the flange 15 presents a small tuft of a soft, yieldable nature.

Therefore, when the spool 1 is mounted on the rod 9 as shown in Fig. 3, the projecting tufts 19 of the fibrous material 18 will be located in the space between the flange 15 and the surrounding flyer 2. When the flyer rotates with respect to the spool 1, as when rewinding the line L on the spool, the tufts 19 will create a brushing effect between the flange 15 and the flyer 2 which will prevent the line from slipping between the spool flange and the flyer and becoming fouled behind the spool.

Since the brushing contact between the tufts 19 and the flyer 2 occurs at spaced points around the flange 15, the desired non-fouling effect is obtained without creating any appreciable friction between the spool and the flyer. Should the tufts 19 become worn after continued use of the reel, the length of material 18 can be removed from the slots 17 and relaced from a different starting point, so as to expose fresh tufts 19 around the outside of the flange 15.

From the foregoing it is apparent that by the present invention there is provided an improved non-fouling spool for use with fishing reels of the line casting type, with the spool serving to effectively prevent fouling of the line between a spool flange and the inside of the rotating flyer. While the reel illustrated in the accompanying drawings is of the particular construction shown in my copending application Serial No. 105,939 filed July 21, 1949, obviously the non-fouling spool of the present invention can be employed with any reel of the line-casting type, wherein there is relative movement between a spool flange and a surrounding flyer element.

I claim:

1. A non-fouling spool for fishing reels, comprising spaced flanges and a central cylindrical line-storing portion therebetween, with one of said flanges being provided with a series of pairs of edge notches oppositely inclined with respect to each other, and a length of soft flexible fibrous material laced back and forth through said notches, with said material being located entirely within said flange, except where it passes between notches on the outside of said flange to expose a series of tufts disposed at intervals around the outside of said flange.

2. A fishing reel construction comprising in combination, a frame, a rotatable cup-shaped flyer mounted on said frame, a shaft slidably mounted on said frame, and movable back and forth with respect to said flyer, a spool mounted on said shaft, and comprising spaced flanges for receiving a line therebetween, with one of said flanges providing edge notches, and a length of soft fibrous material laced between said notches, with said material being located entirely within said flange except where it provides short tufts of material projecting into the space between said flyer and said spool flange.

EDWIN E. VINCENT.

References Cited in the file of this patent

UNITED STATES PATENTS

| Number | Name | Date |
|---|---|---|
| 2,370,699 | Warren | Mar. 6, 1945 |

FOREIGN PATENTS

| Number | Country | Date |
|---|---|---|
| 861,383 | France | Oct. 28, 1940 |
| 262,494 | Switzerland | Oct. 17, 1949 |